H. SEITZ.
Wagon-Brake Shoes.

No. 139,086.  Patented May 20, 1873.

Witnesses:
P. C. Dieterich.
Sedgwick

Inventor:
H. Seitz
Per Munn & Co.
Attorneys.

UNITED STATES PATENT OFFICE.

HENRY SEITZ, OF PALMYRA, MISSOURI.

IMPROVEMENT IN WAGON-BRAKE SHOES.

Specification forming part of Letters Patent No. 139,086, dated May 20, 1873; application filed March 22, 1873.

*To all whom it may concern:*

Figure 1:
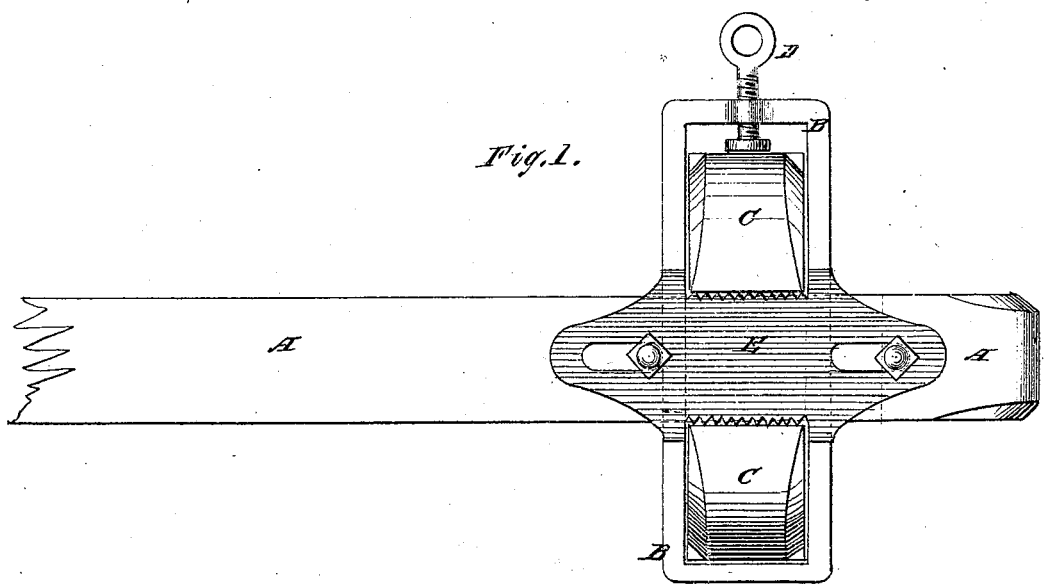
Figure 2:
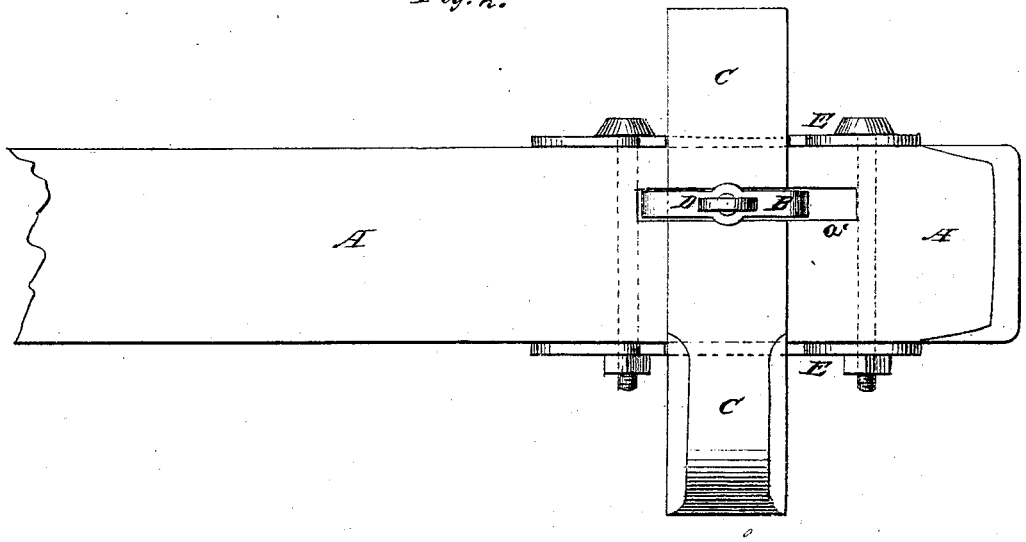

Be it known that I, HENRY SEITZ, of Palmyra, in the county of Marion and State of Missouri, have invented a new and useful Improvement in Wagon-Brake Shoe, of which the following is a specification:

Figure 1 is a rear view of my improved brake-shoe, shown as applied to a brake-bar. Fig. 2 is a top view of the same.

Similar letters of reference indicate corresponding parts.

My invention has for its object to furnish an improved brake-shoe, which shall be so constructed that it may be readily moved up as it is worn away by the friction of the wheel, and which may also be moved laterally to bring it into line with the rim of the wheel. The invention consists in the stirrup or link, the plates, and the blocks, constructed and arranged to operate in connection with the slot in the brake-bar, as hereinafter fully described, and in the slot in the brake-bar to receive the link or stirrup, as hereinafter fully described.

A is the brake-bar, which is connected with the wagon and operated in the ordinary manner. In the end parts of the bar A, about in line with the plane of the wheel, is formed a vertical slot, $a'$, to receive a link or stirrup, B, said slot $a'$ being made longer than the breadth of the link B, so that the shoe may be moved in or out to adjust it to the rim of the wheel. C are blocks of wood, which are passed through the ends of the link B, above and below the bar A, so as to present their ends to the rim of the wheel to receive the friction, the wear being thus across the grain of the wood. The blocks C are clamped in place by a set-screw, D, passing in through the end of the link B, so that its forward end, or a washer swiveled to its forward end, may rest against one of the blocks C. By this construction, by simply loosening the screw D, the blocks C may be moved up against the wheel to take up the wear. To the front and rear sides of the bar A are secured plates E, which are made wider than the thickness of the bar A, and have their edges notched to receive the blocks C, and the edges of one or both of said plates are serrated to take hold of the said blocks C and assist in preventing them from slipping under the pressure of the friction. The plates E are made longer than the length of the slot in the bar A, so that the bolts F that secure the said plates to the said bar may not pass through the said slot. The bolts F pass through slots in the ends of the plates E, so that by loosening the said bolts F the said plates E may be moved with the stirrup B in adjusting the shoe.

Having thus described my invention, I claim as new and desire to secure by Letters Patent—

1. The brake-bar A, having the slot $a'$ and the stirrup or link B arranged therein, as shown and described.

2. The stirrup or link B, the plates E, and the blocks C, in combination with the bar A having the slot $a'$, substantially as herein shown and described, and for the purpose set forth.

HENRY SEITZ.

Witnesses:
I. W. WIDDERFIELD,
DAVID WILLOCK.